United States Patent [19]
Schievelbein et al.

[11] 3,849,328
[45] Nov. 19, 1974

[54] PROCESS AND COMPOSITION FOR INHIBITING SCALE DEPOSITION

[75] Inventors: Vernon H. Schievelbein; Thomas E. Sample, Jr., both of Houston, Tex.

[73] Assignee: Texaco Inc., New York, N.Y.

[22] Filed: May 4, 1972

[21] Appl. No.: 250,183

[52] U.S. Cl................ 252/180, 166/279, 166/310, 210/58, 252/8.55 B
[51] Int. Cl............................................. C02b 5/06
[58] Field of Search.......... 252/180, 8.55 B; 210/58

[56] References Cited
UNITED STATES PATENTS

| | | | |
|---|---|---|---|
| 2,576,386 | 11/1951 | Bird | 210/58 X |
| 2,782,162 | 2/1957 | Liddell | 252/181 X |
| 3,007,864 | 11/1961 | Adolphson et al | 252/8.5 |
| 3,020,232 | 2/1962 | Doughty | 252/8.5 |
| 3,035,042 | 5/1962 | Hoyt | 260/124 |
| 3,168,511 | 2/1965 | King et al. | 252/8.5 X |
| 3,505,238 | 4/1970 | Liddell | 252/180 |
| 3,639,278 | 2/1972 | Hwa | 252/180 X |

*Primary Examiner*—Herbert B. Guynn
*Attorney, Agent, or Firm*—T. H. Whaley; C. G. Ries

[57] ABSTRACT

Scale prone waters may be treated with certain sulfonated alkali lignins to inhibit the build up of mineral scale deposits from the scale prone waters upon surfaces in contact with the scale prone waters. Sulfonated alkali lignins are dissolved in the scale prone waters in sufficient concentration to inhibit the formation of mineral scale on the surfaces.

3 Claims, No Drawings

PROCESS AND COMPOSITION FOR INHIBITING SCALE DEPOSITION

BACKGROUND OF THE INVENTION

This invention concerns methods of inhibiting and/or controlling mineral-scale formation upon surfaces which are normally susceptible to scale formation during contact with mineralized waters.

Inorganic mineral scale concretion or the deposition of scale coatings derived from the extended contact of surfaces normally susceptible to scale formation with hard waters, particularly waters containing alkaline earth compounds, is both wasteful and commonplace. While scale formation upon metal surfaces presents the more serious problem, non-metallic surfaces including ceramics, glasses and organic polymers may also undergo scaling.

Particularly troublesome are the tenacious "furs" or "crusts" that form in operational processing equipment in continuous and/or prolonged contact with aqueous solutions of inorganic salts as, for example, alkaline earth sulfates, carbonates and bicarbonates. This type of scale formation creates serious problems for the petroleum and gas-producing industries, where the build-up of undesirable inorganic mineral scale deposits can take place in equipment or tubing of difficult or limited accessibility. These include flow lines in both surface and subterranean locations, including auxiliary producing equipment, such as heaters, pumps, valves, rods, and the like. In addition, scale formation can also cause substantial problems in the chemical processing industries, public utilities, and in other situations where mineral-laden water is processed or used, as in heat exchangers, storage vessels, piping, reactors, evaporators, and the like.

Several different explanations have been advanced as to how the formation of mineral scale deposits, such as for example calcium or barium sulfate, takes place. One mechanism leading to scale formation comes about from the mingling of a fluid stream containing a substantial concentration of an anion or cation with another stream containing antagonistic counter ions. An illustration of this mechanism would be a case in which one process stream containing a soluble calcium compound contacts another stream containing a soluble sulfate compound to cause precipitation of calcium sulfate. Should the mixing of such incompatible waters take place in a well bore, the result may be deposition of a crust of calcium sulfate which, if allowed, can build up on the surface of submerged equipment such as tubing, and may even choke off fluid flow by diminution of utilizable diameter unless corrective descaling measures are undertaken. In the case of heat exchange equipment, the mineral scale deposition insulates the equipment from the source or sink of heat and increases the cost of operation and may cause extensive maintenance or downtime and increased operational costs.

Another cause of mineral scale formation arises from aqueous solutions of inorganic materials having an inverse solubility curve, that is, a solubility which decreases as the temperature increases. An excellent example of this is calcium sulfate, whose solubility in water decreases with increased temperature. In these instances the solution immediately adjacent to the heating surface reaches saturation the most quickly, dropping calcium sulfate at this juncture which is held tenaciously to the heating surface.

Yet another cause of scale formation is attributable to precipitation of scale material from supersaturated solutions, of which the preceding example is a special case. When temperature and/or pressure changes occur, or the concentration of some solubilizing substances is substantially decreased, this change of conditions can result in scale formation on the tubing or other equipment being operated.

Whatever the reason or reasons for scale formation may be, as outlined above, it is a troublesome and expensive process that can lead to costly, unscheduled maintenance and even to the breakdown of operational units. For these reasons, a number of remedial measures have been resorted to, both for the removal of scale and mitigation of its formation.

Scale is ordinarily removed by either chemical or mechanical methods, or a combination of both methods. In chemical descaling procedures, the problem is to find a material that will dissolve or loosen the mineral scale without attaching the underlying substrate.

Inhibited hydrochloric acid has proved useful in instances where the scale is acid soluble, as is the case with calcium carbonate scale. Unfortunately, however, many mineral scales, such as those of calcium and barium sulfates, are not appreciably soluble in acids: Calcium sulfate scale can sometimes be dissolved or loosened by treatment with ammonium salts, polyphosphates, or hydroxides, often followed by acid washing.

Mechanical descaling procedures are often resorted to employing such devices as scrapers, brushes, high-pressure abrasive jets, and the like, but these methods are tedious, expensive, and of restricted applicability.

It is an object of this invention to provide a method whereby these harmful scale deposits are inhibited from forming on a surface, thus avoiding the problems of removal.

Scale prone waters as used herein refers to aqueous solutions of mineral compounds which tend to form scale on surfaces contacting the waters.

SUMMARY OF THE INVENTION

The invention is a method of inhibiting the formation of mineral scale upon a substrate surface in contact with scale prone waters. The method comprises dissolving in the scale prone waters about 0.0005 to about 0.01 weight percent of sulfonated alkali lignin compounds. The invention is also the scale inhibiting solution.

DESCRIPTION OF THE PREFERRED EMBODIMENTS

Lignin is second only to cellulose as the principal constituent in wood. Generally, lignin is a complex phenolic polyether containing many different functional groups, including carboxyls, carbonyls and alcoholic and phenolic hydroxyls. Lignins and their derivatives are described in Kirk-Othmer, Encyclopedia of Chemical Technology, Second Edition, Volume 12 beginning at page 361. Certain lignin derivatives are useful in the process of our invention are manufactured by a particular process which distinguishes them over other lignins and lignin derivatives which have been found to be less useful as scale inhibitors.

Very briefly, the above publication describes two very broad classes of lignin derivatives: sulfite lignins and alkali lignins.

The difference in the lignins exists because of the method of extraction of lignin material from woody materials. The lignin derivatives which are preferred for the process of our invention are made by sulfonation of the so called alkali lignins.

The sulfonated alkali lignins useful in our invention

The structure of the preferred sulfonated alkali lignins is not known, but one skilled in the art may determine from a description of the manufacturing technique used to prepare a lignin derivative whether that lignin derivative falls within the class of sulfonated alkali lignins preferred for use in our invention. The following Table I gives data concerning the properties of typical commercially available sulfonated alkali lignins suitable for use in the process of our invention.

TABLE I

TYPICAL PROPERTIES OF SULFONATED ALKALI LIGNINS

| PROPERTY | A | B | C | D | E | F | G | H | J |
|---|---|---|---|---|---|---|---|---|---|
| Degree of Sulfonation* | 2.0–2.5 | 2.0–2.5 | 1.9–2.4 | 1.6 | 2.5–3.0 | 3.5–4.0 | 0.8–1.1 | 2.0 | 3.7 |
| pH | 11.0–12.0 | 8.0–9.5 | 9.2–9.8 | 11 | 7.5–9.0 | 4.5–6.5 | 10.2–11.2 | 10.5 | 11 |
| %, Ash | 30 – 36 | 30 – 36 | 18 – 23 | — | 18 – 23 | 1 – 3 | 17 – 22 | — | — |
| pH of Precipitation in 5% Solutions | 0.5 | 0.5 | 0.5 | — | 0.5 | 5.0 | 3.5 | — | — |
| Type Cation | $Na^+$ | $Na^+$ | $Na^+$ | $Na^+$ | $Na^+$ | $Na_4^+$ | $Na^+$ | $Na^+$ | $Na^+$ |

*Number of sulfonate groups per 1,000 unit weight of lignin.

are readily available commercially from various sources including but not limited to West Virginia Pulp and Paper Company of North Charleston, South Carolina under the tradename REAX 80's. Their general method of preparation is described in the Encyclopedia of Chemical Technology referred to above. Briefly, the sulfonated alkali lignins useful in our invention are prepared as follows according to the above publication.

Wood chips are cooked with a 10 percent solution of a mixture of sodium hydroxide with about 20 mole percent of sodium sulfide. The lignin with wood is modified into a sodium compound, often termed sodium lignate or alkali lignin, which is very soluble in the strongly alkaline solution. These alkali lignins are removed from solution by lowering the pH which precipitates out the alkali lignins. These unsulfonated alkali lignins are sold under various tradenames including Indulin. Also, these alkali lignins are used to prepare the sulfonated derivatives useful in our invention. Methods of sulfonation are known to those skilled in the art. One typical method involves treating the alkali lignins with a solution of alkali sulfites at elevated temperature and pressure. The degree of sulfonation may be controlled to provide a variety of sulfonated alkali lignins useful in the process of our invention.

The degree of sulfonation and molecular weight of the sulfonated alkali lignins have no discernable effect on scale inhibiting performance.

Sulfite lignins are not preferred in the process of our invention. Sulfite lignins are generally made by cooking wood chips under pressure in a solution of sulfurous acid and calcium, magnesium, sodium, or ammonium bisulfate. This process converts insoluble lignins to soluble lignosulfonic acid. The lignosulfonic acid or calcium, magnesium, sodium, or ammonium salts of the lignosulfonic acids are available under various tradenames including Marasperse, Orzan, Toranil, and Rayflo.

To reiterate, only sulfonated alkali lignins are useful in the process of our invention. Other lignin derivatives such as alkali lignins, and sulfite lignins do not impart unusual scale inhibiting properties to aqueous solutions and are not included within the scope of our invention.

The sulfonated alkali lignins will inhibit the formation of mineral scale if they are introduced into the scale prone waters by any convenient means in an amount sufficient to provide about 0.0005 to about 0.01 percent of the said lignin derivative by weight. For instance, aqueous solutions containing from about 1 to about 50 percent by weight of these sulfonated alkali lignins can be prepared and perhaps stored and later added to scale prone waters to provide a total concentration of from about 0.0005 to about 0.01 percent by weight. These "concentrate" solutions of the sulfonated alkali lignins of our invention may be added directly to scale prone waters and should be mixed in any convenient way known to the art in order to provide uniform dispersion. The sulfonated alkali lignins may also be added to scale prone waters in any other convenient conventional manner including adding the solid sulfonated alkali lignin directly to the scale prone water to be treated and then providing for mixing to cause dispersion of the material in the water. Uniform dispersion of the sulfonated alkali lignin is necessary to insure that a sufficient amount of the lignin derivative is mixed with the water at points where scale deposition is normally likely to occur.

The resulting scale inhibiting solution may be used to inhibit scale formation on the parts of equipment such as pumps, boilers, piping and other equipment exposed to scale prone waters. Scale deposition upon well casing, tubing, pumps, and related equipment may be encountered where scale prone water is injecting into subterranean formations. In this case the method of this invention will inhibit scale deposition if sufficient amounts of sulfonated alkali lignins are dispersed into the scale prone water to be injected.

Where subterranean petroleum reservoirs produce scale prone water in addition to petroleum, scale deposition will be inhibited by injecting a solution of sulfonated alkali lignin solution into the formation around the well bore and then resuming production. The produced scale prone water will carry with it the sulfonated alkali lignin previously injected. When the sulfonated alkali lignin is depleted the injection-production cycle should be repeated.

EXAMPLE 1

The following data in Table II demonstrates the superiority of the sulfonated alkali lignins over conventional materials marketed as scale control chemicals. Examination of the data in Table II reveals that all sulfonated alkali lignins tried prevented scale deposition and are superior to most recognized scale control chemicals.

The following procedure was used in the evaluation: Into a 1,000 ml. beaker, there was placed sufficient calcium sulfate and sodium chloride (obtained by mixing solutions of calcium chloride and sodium sulfate) to produce therein an aqueous solution containing 10,000 parts per million of calcium sulfate and 50,000 parts per million of sodium chloride. A preweighted metal rotor attached to an externally provided mechanical stirring device was immersed in the test solution for a period of 24 hours. The solution was maintained at a temperature of 104° F. during the test period. At the end of the 24 hours, the rotor was removed from the solution and from the stirrer, dried and re-weighed. The difference in weights of the rotor was taken as the amount of calcium sulfate scale deposited.

nated alkali lignins of the invention as depicted in Example 1.

| Conc. of Additive (ppm) | Weight of Scale Deposited | | |
|---|---|---|---|
| | 0 | 50 | 100 |
| Control 1 (No Additive) | 1.5287 | | |
| Control 2 (No Additive) | 1.1189 | | |
| Control 3 (No Additive) | 1.6195 | | |
| Sulfite Lignin 1 | | 0.6576 | |
| Sulfite Lignin 2 | | 1.1480 | |
| Sulfite Lignin 3 | | 1.0463 | |
| Unsulfonated Alkali Lignin 1 | | | 0.7063 |
| Unsulfonated Alkali Lignin 2 | | | 1.0113 |
| Unsulfonated Alkali Lignin 3 | | | 0.9917 |

We claim:

1. A method for inhibiting the formation of mineral scale upon a substrate surface in contact with scale prone waters which comprises
    dissolving sulfonated alkali lignins in the scale prone waters in an amount from about 0.0005 percent to about 0.01 percent by weight.

2. A method of claim 1 wherein the sulfonated alkali lignins have a degree of sulfonation from about 0.8 to about 4.0.

TABLE II

| Scale-Control Additive | Weight of scale deposited (grams) after 24 hours at 40°C. (104°F.) | | | | | | | |
|---|---|---|---|---|---|---|---|---|
| Conc. of Additive (ppm) | 0 | 5 | 10 | 15 | 20 | 30 | 50 | 60 |
| Control | 1.711 | | | | | | | |
| Control | 1.666 | | | | | | | |
| Sulfonated Alkali Lignins | | | | | | | | |
| A[1] | | 0.404 | 0.004 | 0.011 | | | | 0.006 |
| C[1] | | 0.013 | | 0.208 | | 0.021 | | |
| D[1] | | 0.009 | 0.009 | 0.043 | | | | |
| E[1] | | 0.224 | | 0.344 | | 0.183 | | |
| F[1] | | 0.013 | | 0.010 | | 0.007 | | |
| G[1] | | 0.009 | | 0.053 | | 0.017 | | |
| H[1] | | 1.187 | | 0.356 | | 0.053 | | |
| J[1] | | 0.146 | | 0.023 | | 0.130 | | |
| Scortron R-46[2] | | 1.299 | 1.210 | | | | | |
| Scortron R-47[2] | | | 0.227 | 0.038 | | | | |
| Calnox 209[3] | | 1.022 | 1.132 | 1.324 | | | | |
| Gyptron C-30[4] | | | 1.398 | 1.620 | | | | |
| TC-6694[5] | | 0.920 | 1.007 | 1.195 | 0.348 | | | |

[1]Product of West Virginia Pulp and Paper Co., Westvaco Polychemicals Products
[2]Product of Champion Chemicals, Inc.
[3]Product of Milchem Inc.
[4]Product of Champion Chemicals, Inc.
[5]Product of Texaco, Inc.

EXAMPLE 2

The same procedure as used in Example 1 was used to test the scale inhibiting properties of a sulfite lignin and an unsulfonated alkali lignin. The data show these to be inferior in scale inhibiting properties to the sulfo- 3. An aqueous solution which will inhibit the formation of mineral scale upon substrate surfaces which consists essentially of
    an aqueous solution of sulfonated alkali lignins in an amount from about 0.0005 to 0.01 percent by weight.

* * * * *